United States Patent [19]

Smutny

[11] Patent Number: 4,999,399

[45] Date of Patent: Mar. 12, 1991

[54] POLYMER COMPOSITIONS

[75] Inventor: Edgar J. Smutny, Houston, Tex.

[73] Assignee: Shell Oil Company, Houston, Tex.

[21] Appl. No.: 471,466

[22] Filed: Jan. 29, 1990

[51] Int. Cl.$^5$ .................. C08L 23/00; C08L 33/02; C08L 101/06
[52] U.S. Cl. .................................. 525/185; 525/539
[58] Field of Search .............................. 525/185, 539

[56] References Cited

U.S. PATENT DOCUMENTS

| | | | |
|---|---|---|---|
| 3,694,412 | 9/1972 | Nozaki | 260/63 CQ |
| 4,281,087 | 7/1981 | Heuschen et al. | 525/365 |
| 4,874,819 | 10/1989 | George et al. | 525/185 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |

Primary Examiner—John C. Bleutge
Assistant Examiner—Thomas Hamilton, III

[57] ABSTRACT

Compositions comprising linear alternating polymer of carbon monoxide and at least one ethylenically unsaturated hydrocarbon are provided improved melt stability upon incorporation of a stabilizing quantity of the reaction product of an oxy-bridged zinc-aluminum compound and an acidic polymer containing moieties of an α-olefin and an α,β-ethylenically unsaturated carboxylic acid.

11 Claims, No Drawings

POLYMER COMPOSITIONS

FIELD OF THE INVENTION

This invention relates to stabilized compositions comprising linear alternating polymers of carbon monoxide and at least one ethylenically unsaturated hydrocarbon. More particularly, the invention relates to compositions of improved melt stability comprising the linear alternating polymer and the reaction product of an oxy-bridged zinc-aluminum compound and an acidic polymer containing moieties of an α-olefin and an α,β-ethylenically unsaturated carboxylic acid.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, e.g., peroxy compounds. G.B. No. 1,081,304 produced similar polymers of higher carbon monoxide content in the presence of alkylphosphine complexes of palladium salts as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent processes for the production of the linear alternating polymers, now becoming known as polyketones or polyketone polymers, are illustrated by a number of published European Patent Application Nos. including 121,965, 181,014, 213,671 and 257,663. The process generally involves the use of a catalyst composition formed from a compound of palladium, cobalt or nickel, the anion of a strong non-hydrohalogenic acid and a bidentate ligand of phosphorus, arsenic or antimony.

The resulting materials are relatively high molecular weight thermoplastic polymers having established utility as premium thermoplastics in the production of shaped articles such as containers for food and drink by procedures which are conventionally employed with thermoplastics.

It is known that the addition of other materials, both organic and inorganic, may serve to modify the properties of the polyketone polymers. The formation of polyketone blends, for example, seeks to maintain the more desirable properties of the polyketone polymers while improving other properties. Addition of other materials may serve to increase the stability of the polyketones polymer. Stabilization of the polyketones against undue loss of crystallinity upon melting and solidification by the addition of aluminum stearate is shown by U.S. Pat. No. 4,954,555. Similar results upon the addition of certain aluminum phenoxides are shown by U.S. Pat. No. 4,950,703. Blends of the polyketone polymers and the acidic polymers are the subject of U.S. Pat. No. 4,874,819. It would be of advantage to provide additional compositions of the linear alternating polymers and metal compounds which have desirable properties somewhat different from those of the polyketone polymers.

SUMMARY OF THE INVENTION

This invention provides compositions comprising linear alternating polymers of carbon monoxide and at least one ethylenically unsaturated hydrocarbon characterized by an improved melt stability and relatively low loss of crystallinity upon melting and solidification. More particularly, the invention provides compositions of the linear alternating polymer and the reaction product of an oxy-bridged compound and an acidic polymer containing moieties of an α-olefin and an α,β-ethylenically unsaturated carboxylic acid. The oxy-bridged compound has the general structure

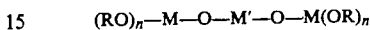

$(RO)_n-M-O-M'-O-M(OR)_n$ where M' may be any divalent metal (e.g., Cr,Mn,Fe,Co,Zn,Mo), M is either $Al^{III}$ or $Ti^{IV}$, and R is usually an alkyl group, e.g., $(i-PrO)_2Al-O-Al(O\ i-Pr)_2$. Preferably M is aluminum and M' is zinc.

DESCRIPTION OF THE INVENTION

The polymers which are stabilized against undue degradation in molten form are linear alternating polymers of carbon monoxide and at least one ethylenically unsaturated hydrocarbon. The ehtylenically unsaturated hydrocarbons which are useful as precursors of the linear alternating polymers have up to 20 carbon atoms inclusive, preferably up to 10 carbon atoms inclusive, and are aliphatic including ethylene and other α-olefins such as propylene, 1-butene, isobutylene, 1-hexene, 1-octene and 1-docecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers are employed in the compositions of the invention, there will be within the terpolymer at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore represented by the repeating formula

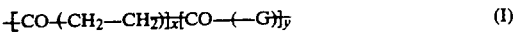

$$\pm[CO\pm(CH_2-CH_2)]_x[CO-(-G)]_y \qquad (I)$$

wherein G is the moiety of the second ethylenically unsaturated hydrocarbon of at least 3 carbon atoms polymerized through the ethylenic unsaturation and the ratio of y:x is no more than about 0.5. In the modification of the invention where copolymers are employed there will be no second hydrocarbon present and the copolymers are represented by the above formula I wherein y is zero. When y is other than zero, i.e., terpolymers are employed, the $-CO-(-CH_2CH_2-)-$ units and the $-CO-(-G-)-$ units are found randomly throughout the polymer chain and preferred ratios of y:x will be from about 0.01 to about 0.1. The end groups or "caps" of the polymer chain will depend upon what materials were present during the production of the polymer and how or whether the polymer has been purified. The end groups are of little apparent significance so far as the overall properties of the polymer are concerned so that the polymer is fairly represented by the polymer chain as depicted above.

Of particular interest are the polymers of the above formula having a number average molecular weight of from about 1000 to about 200,000, especially those polymers having a number average molecular weight from about 20,000 to about 90,000, as determined by gel permeation chromatography. The physical properties of the polymers are determined in part by the molecular weight, whether the polymer is a copolymer or a terpolymer and, in the case of terpolymers, the nature of and the proportion of the second hydrocarbon present. Typical melting points for such polymers are from about 175° C. to about 300° C., more often from about 210° C. to about 270° C. The polymers will have a limiting viscosity number (LVN), measured in a standard capillary viscosity measuring device in m-cresol at 60° C., of from about 0.4 dl/g to about 10 dl/g, preferably from about 0.8 dl/g to about 4 dl/g.

The polymers are produced by the general methods of the above published European Patent Applications. Although the scope of the polymerization is extensive, and without wishing to be limited, a preferred catalyst composition is formed from a palladium compound, particularly a palladium alkanoate such as palladium acetate, the anion of a non-hydrohalogenic acid having a pKa (measured in water at 18° C.) of below 2, particularly trifluoroacetic acid or p-toluenesulfonic acid, and a bidentate ligand of phosphorus such as 1,3-bis(diphenylphosphino)propane or 1,3-bis[di(4-methoxyphenyl)propane. The reactants are typically contacted in the presence of the catalyst composition and a reaction diluent under polymerization conditions. Suitable reaction diluents include the lower alkanols such as methanol or ethanol and methanol is preferred. Typical polymerization conditions include a reaction temperature of from about 20° C. to about 150° C., preferably from about 50° C. to about 135° C. Suitable reaction pressures are from about 10 atmospheres to about 200 atmospheres but reaction pressures from about 20 atmospheres to about 100 atmospheres are preferred. The contact of the reactants and the catalyst composition is maintained in a suitable reactor by conventional methods such as shaking or stirring. Subsequent to polymerization the reaction is terminated as by cooling the reactor and contents and releasing the pressure. The polymer product is generally obtained as a material substantially insoluble in the reaction diluent and is recovered by well known procedures such as filtration or decantation. The polymer is used as recovered or is purified as by contact with a solvent or extraction agent which is selective for catalyst residues.

The metal-containing component of the compositions of the invention is the reaction product of an oxy-bridged compound of certain metals and an acidic polymer containing moieties of an α-olefin and an α,β-ethylenically unsaturated carboxylic acid. The oxy-bridged compound used herein is a member of the class of μ-oxoalkoxide compounds known as Teyssie compounds. Such compounds are of interest because of a stoichiometrically specific ratio of metal atoms. The compounds have the general structure

where M' may be any divalent metal (e.g., Cr,Mn,Fe,Co,Zn,Mo), M is either Al$^{III}$ or Ti$^{IV}$, and R is usually an alkyl group. The preferred oxy-bridged compounds of zinc and aluminum have two aluminum atoms for each atom of zinc and are represented by the formula

 (II)

wherein R independently is alkyl of up to 10 carbon atoms inclusive, but preferably is lower alkyl of up to 4 carbon atoms inclusive. The production of such compounds is by known methods, but in a representative synthesis, zinc acetate, free from zinc oxide, is produced by reaction of a zinc dialkyl, e.g., zinc diethyl, and acetic acid. The zinc acetate is then combined with an aluminum trialkoxide such as aluminum triisopropoxide. The resulting zinc-aluminum compound is represented by the above formula II wherein R is isopropyl. Other Teyssie compounds are produced by similar procedures. See generally Teyssie et al, Catalysis with Soluble Bimetallic Oxides, CHEMTECH, Mar. 1977, pages 192–194.

To form the precursor of the compositions of the invention the oxy-bridged compound of aluminum and zinc is reacted with an acidic polymer containing moieties of an α-olefin and an α,β-ethylenically unsaturated hydrocarbon. The α-olefin portion of the acidic polymer is an α-olefin of up to 10 carbon atoms such as ethylene, propylene, 1-butene, isobutylene, 1-octene and 1-decene. Preferred α-olefins are straight-chain α-olefins of up to 4 carbon atoms, especially ethylene or propylene. Particularly preferred as the α-olefin component of the acidic polymer is ethylene. The α-olefin will be present in at least 75% by mole of the acidic polymer and preferably will be present in at least 85% by mole based on total acidic polymer.

The unsaturated carboxylic acid component of the acidic polymer is an α,β-ethylenically unsaturated carboxylic acid of up to 10 carbon atoms inclusive and is illustrated by acrylic acid, methacrylic acid, 2-hexenoic acid, 2-octenoic acid and 2-decenoic acid. The preferred α,β-ethylenically unsaturated carboxylic acids have up to 4 carbon atoms inclusive. These are acrylic acid, methacrylic acid and crotonic acid, of which acrylic acid is preferred. The content of the unsaturated acid in the acidic polymer is from about 1% by mole based on total acidic polymer. Amounts of unsaturated acid from about 1% by mole to about 15% by mole on the same basis are preferred.

The acidic polymer is suitably a copolymer of the α-olefin and the α,β-unsaturated carboxylic acid and in general such copolymers are preferred. On occasion, however, it is useful to include within the acidic polymer an optional amount of a third monomer, particularly a non-acidic, low molecular weight polymerizable monomer of up to 8 carbon atoms inclusive. Such optional third monomer may be an additional α-olefin such as propylene or styrene when the principal α-olefin is ethylene, an unsaturated ester such as vinyl acetate or methyl methacrylate, an unsaturated halohydrocarbon such as vinyl fluoride or vinyl chloride or an unsaturated nitrile such as acrylonitrile. When a third monomer is present, amounts of the third monomer up to about 5% by mole based on total acidic polymer are satisfactory with amounts up to about 3% by mole on the same basis being preferred.

The acidic polymers are known materials or are produced by known methods. A number of the acidic polymers are commercial. Suitable polymers of ethylene and methacrylic acid are marketed by Dow under the trademark PRIMACORE® and polymers of ethylene and acrylic acid are marketed by DuPont under the trademark NUCREL®.

The acidic polymer is reacted with the oxy-bridged zinc-aluminum compound to provide the component of the compositions of the invention. Without wishing to be bound by any particular theory, it appears probable that the zinc-aluminum compound serves to partially neutralize a portion of the carboxylic acid groups of the acidic polymer with zinc and aluminum. By employing a zinc-aluminum compound of specific stoichiometric proportions, it is considered likely that the neutralization of acidic sites also occurs in the stoichiometrically specific ratio of the oxy-bridged zinc-aluminum compound employed. In one modification of the invention the acidic polymer and the zinc-aluminum compound react in the presence of the polyketone polymer by mixing the materials together and applying heat. In a preferred modification, however, the acidic polymer and the zinc-aluminum compound are reacted separately and the reaction product is provided to the linear alternating polymer. In this modification, the zinc-aluminum compound and the acidic polymer are heated under reflux in toluene and the isopropyl alcohol (IPA) removed by distillation. The suitable ratios of zinc-aluminum compound to acidic polymer to be used in the reaction are from about 10% by weight to about 80% by weight of zinc-aluminum compound based on total reaction mixture. Quantities of zinc-aluminum compound from about 10% by weight to about 30% by weight based on total reaction mixture are preferred.

The linear alternating polymer is stabilized by the inclusion therein of a stabilizing quantity of the reaction product of the zinc-aluminum compound and the acidic polymer. Quantities of reaction product from about 0.05% by weight to about 10% by weight based on total composition are satisfactory. Quantities from about 0.1% by weight to about 3% by weight on the same basis are preferred. The method of mixing the polyketone polymer and the reaction product is not material so long as an intimate mixture of the two components is obtained. In one embodiment of the mixing process the components are dry-blended and intimately mixed by passage through an extruder. In an alternate embodiment the mixing is accomplished by placing the components present in a finely divided state in a mixing device or blender operating at high shear and thermal energy.

The compositions of the invention may contain other conventional additives such as colorants, plasticizers, fibers, fillers and mold release agents which are provided to the composition together with or separately from the polyketone polymer and reaction product components.

The resulting stabilized polyketone polymer compositions will have an improved melt stability as evidenced by a relatively constant apparent crystallinity when subjected to melt processing operations of melting and solidification (crystallization). This improvement in retained apparent crystallinity offers considerable advantages which are not to be found in the unstabilized polymer. For example, the stabilized polymer composition, or unstabilized polymer, is often formed as nibs by passage through an extruder. The nibs are then injection molded to produce shaped articles. In the case of the stabilized composition, the polyketone retains a relatively constant apparent crystallinity as evidenced by a relatively constant melting point or other physical property through the two cycles of melting and solidification. The compositions are therefore particularly useful in this and other applications which require a series of melting and solidification cycles. While the compositions are also useful in applications which do not involve the melting and solidification of the polymer, the advantages are most apparent when melt processing operations are to be employed. Thus, the compositions of the invention are useful in a variety of applications as engineering thermoplastics but are particularly useful in the production of articles requiring a number of melting/solidification cycles. Illustrative of such articles are containers for food and drink and parts and housings for automotive applications.

The invention is further illustrated by the following Illustrative Embodiments which should not be regarded as limitations.

ILLUSTRATIVE EMBODIMENT I

A terpolymer of carbon monoxide, ethylen and propylene was produced in the presence of a catalyst composition formed from palladium acetate, the anion of trifluoroacetic acid and 1,3-bis[di(2-methoxyphenyl)-phosphino]propane. The polymer had a melting point of 223° C. and a limiting viscosity number (LVN), measured in m-cresol at 60° C., of 1.81 dl/g.

ILLUSTRATIVE EMBODIMENT II

The oxy-bridged compound (Teyssie compound) was prepared by adding the following to a two-liter flask.

| | |
|---|---|
| Zn(OAc)$_2$ | 20 grams |
| Al(IPA)$_3$ anhydride | 44.5 grams |
| Decaline (anhydride and N$_2$ capped) | 1 liter |

The ingredients were then heated under reflux conditions to 200° C. and the isopropyl alcohol (IPA) was removed by distillation. The Teyssie compound (48.2 grams) was recovered, dissolved in hot toluene and passed through a filter. The amount of Teyssie compound finally recovered was 44.66 grams.

ILLUSTRATIVE EMBODIMENT III

The oxy-bridged zinc-aluminum compound of Illustrative Embodiment II was reacted with NUCREL® 535, a commercially available copolymer of ethylene and acrylic acid. The reaction was conducted by dissolving the two compounds in toluene, heating the mixture under reflux conditions, cooling to room temperature and recovering the solid by filtration.

ILLUSTRATIVE EMBODIMENT IV

Compositions were produced from the terpolymer of Illustrative Embodiment I and the reaction product of Illustrative Embodiment III. Nibs of the terpolymer were cryoground and dry-blended with the reaction product of the zinc-aluminum compound and the acidic polymer. The mixture was then tumbled overnight in nitrogen and extruded through an extruder operating at 275° C. in an air atmosphere.

Measurements of the melting points and the crystallization temperatures of the compositions produced, as well as the heats of melting and heats of fusion, were made with the use of a Perkin-Elmer DSC 7 differential scanning calorimeter (DSC) and samples of the polymeric compositions or of the unstabilized terpolymer (as a control) in sealed pan containers. The pan and contents are heated at a controlled rate, typically 20° C./minute, until reaching the temperature at which the sample melts, $T_m1$. The pan and contents are then cooled to the temperature at which the sample solidifies, $T_c1$, and then are heated past the second melting point, $T_m2$, to 285° C. at which temperature the sample is maintained for 10 minutes. The pan and contents are then cooled until the sample has solidified a second time, $T_c2$. The melting temperature and crystallization temperature are defined as the temperatures at which the heat flow reaches a maximum (for melting) or a minimum (for crystallization). Typically, the melting point $T_m$ will be higher than the temperature of crystallization $T_c$ and each will decrease somewhat with repeated melting and solidification. Although a number of factors influence the melting point and the crystallization temperature, these values are influenced by the crystallinity of the polymer. In general, the smaller the difference between the first and second melting points or the first and second crystallization temperatures, the greater the degree of retained crystallinity.

It is also possible to determine through the use of the DSC the magnitude of the first and second heats of melting ($H_1$ and $H_2$) in cal/g and the first and second heats of crystallization ($C_1$ and $C_2$), also in cal/g, for the terpolymer and for the stabilized compositions. In general, the heats of crystallization will be higher for the stabilized composition than for the unstabilized terpolymer. The higher the ratio $C_2/C_1$ is, the greater the degree of retained crystallinity. The results of the measurements are shown in the Table in which Composition A is terpolymer plus 3% by weight of a first reaction product of the zinc-aluminum compound and NUCREL ® 535 (20% neutralization, 4:1 ratio of the NUCREL ® 535:the zinc-aluminum compound) and Composition B is terpolymer plus 0.3% by weight of a second reaction product of the zinc-aluminum compound and NUCREL ® 535 (10% neutralization, 8:1 ratio of the NUCREL ® 535:the zinc-aluminum compound).

TABLE

| Sample | $T_c2$ | $C_2/C_1$ |
| --- | --- | --- |
| Terpolymer | 163.1 | 0.81 |
| Composition A | 163.3 | 0.83 |
| Composition B | 163.7 | 0.85 |

What is claimed is:

1. A stabilized polymer composition comprising a linear alternating polymer of carbon monoxide and at least one ethylenically unsaturated hydrocarbon and a stabilizing quantity of the reaction product of an oxy-bridged zinc-aluminum compound and an acidic polymer containing moieties of an $\alpha$-olefin and an $\alpha,\beta$-ethylenically unsaturated carboxylic acid.

2. The composition of claim 1 wherein the linear alternating polymer is represented by the repeating formula

wherein G is the moiety of an ethylenically unsaturated hydrocarbon of at least 3 carbon atoms polymerized through the ethylenic unsaturation thereof and the ratio of y:x is no more than about 0.5.

3. The composition of claim 2 wherein the acidic polymer is a polymer of ethylene or propylene and acrylic acid or methacrylic acid.

4. The composition of claim 3 wherein the zinc-aluminum compound is of the formula

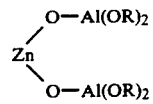

wherein R independently is alkyl of up to 10 carbon atoms inclusive.

5. The composition of claim 4 wherein the acidic polymer is a copolymer of ethylene and acrylic acid or methacrylic acid.

6. The composition of claim 5 wherein the quantity of the zinc-aluminum compound present in the reaction mixture is from about 10% by weight to about 80% by weight, based on total reaction mixture.

7. The composition of claim 6 wherein the reaction product is present in an amount of from about 0.05% by weight to about 10% by weight based on total composition.

8. The composition of claim 7 wherein y is zero.

9. The composition of claim 7 wherein G is a moiety of propylene and the ratio of y:x is from about 0.01 to about 0.1.

10. The composition of claim 9 wherein the acidic polymer is a copolymer of ethylene and acrylic acid.

11. The composition of claim 10 wherein R is isopropyl.

* * * * *